Figure 1:
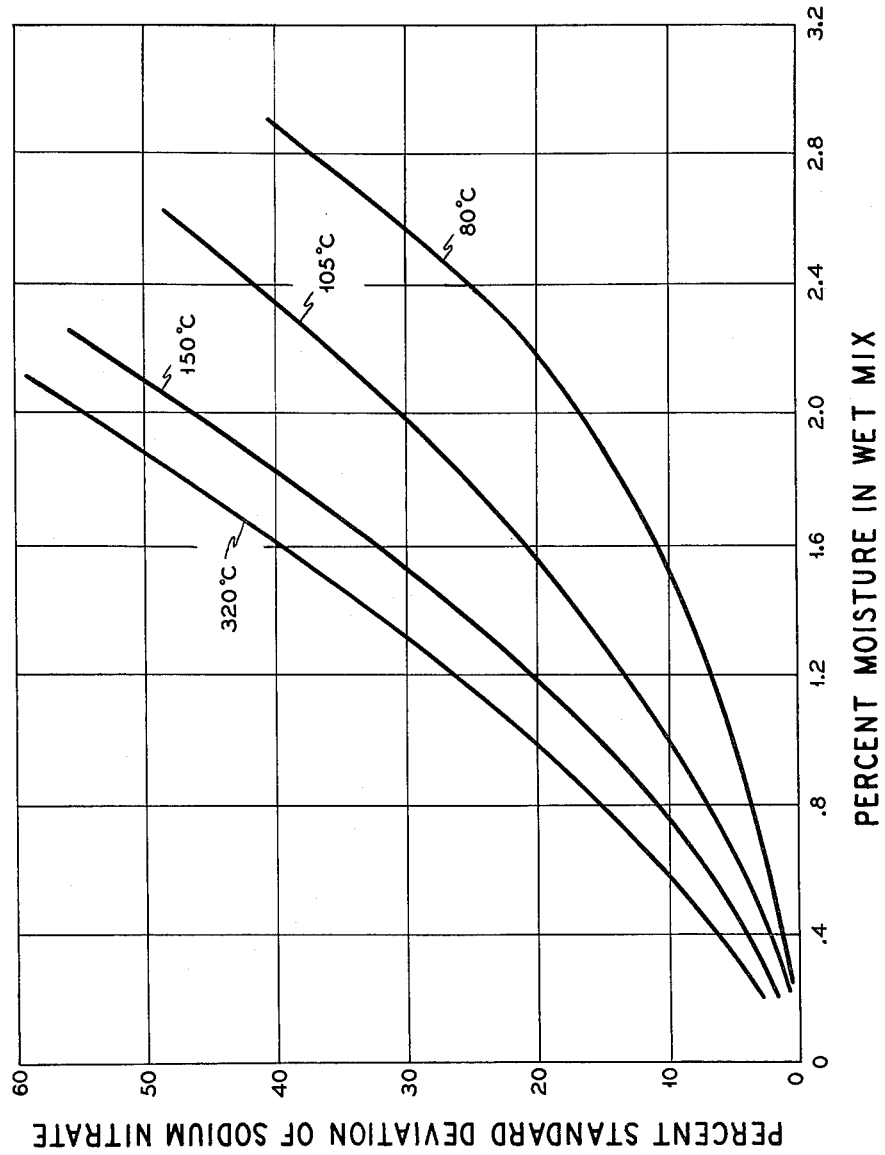

March 8, 1966     H. G. BRANDSTATTER     3,239,362
EXOTHERMIC ADDITION AGENT
Filed Dec. 7, 1961     2 Sheets-Sheet 1

INVENTOR
HANS G. BRANDSTATTER

BY Frederick J. McCarthy Jr.
ATTORNEY

INVENTOR
HANS G. BRANDSTATTER

United States Patent Office 3,239,362
Patented Mar. 8, 1966

3,239,362
EXOTHERMIC ADDITION AGENT
Hans G. Brandstatter, Welland, Ontario, Canada
Filed Dec. 7, 1961, Ser. No. 157,649
2 Claims. (Cl. 106—286)

The present invention relates to exothermic addition agents. More particularly, the present invention relates to bonded exotherimc ferroalloy addition agents which have extremely low moisture contents and which provide high ferroalloy recoveries.

Exothermic addition agents, particularly exothermic ferrochrome and exothermic ferromanganese, are widely employed in the metallurgical art as ladle additions in open hearth operations. As compared to other types of ferroalloy additions, exothermic additions generally provide higher recoveries of chromium and manganese and also permit closer process control.

In the usual practice, exothermic ferroalloy addition agents are prepared from a mixture of finely ground ferrolalloy material, sodium nitrate, a reducing material in finely divided form and a binder. These materials are mixed, packed in suitable containers and cured to set up a bond after which the containers are sealed and appropriately labeled.

The exothermicity developed by the aforedescribed addition agents, when employed in metallurgical operations, is derived from the reaction of the sodium nitrate and the reducing material which may, for example, be aluminum or silicon. The amounts of aluminum or silicon generally used are slightly in excess of the stoichiometric amounts which can be caluculated from the following reactions:

(1) 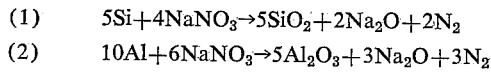

(2) $10Al + 6NaNO_3 \rightarrow 5Al_2O_3 + 3Na_2O + 3N_2$

The binders previously used in the manufacture of exothermic ferroalloy addition agents are Portland cement and organic materials such as pulverized thermoplastic wood resins. These binders, while widely used in the art, have not been entirely satisfactory, particularly when employed in open hearth steel making operations.

For example, cement, which is commonly used, retains a substantial amount of water in setting up a hydraulic bond between the addition agent constituents and this retained moisture cannot be driven off at conventional drying temperatures. Since the specifications regarding moisture in exothermic additions for steel making are ordinarily set quite low (e.g., 0.25 percent max.), in order to prevent heavy boiling in the steel bath, the use of cement as a binding material is substantially restricted.

When employing resin-type binders, there is no significant problem in meeting the required moisture specifications. However, when added to a heat of steel, resin-bonded exothermic additions produced prolonged and excessive flaming and fuming due to combustion of the bonding material. This fuming and flaming may continue for the entire duration of a tapping period and thus seriously interfere with observation of the introduction of other alloy additions into the ladle. Since the possibility of a "hang up" of subsequent additions, or other similar malfunction, is an ever present consideration, it is extremely important that complete observation of the addition operation be permitted.

Further, when using organic type bonding materials the manufacture of addition agents having extremely low carbon contents cannot be accomplished.

Attempts have been made to dispense with the use of heterogeneous binders to overcome the aforementioned disadvantages by preparing addition agents from a wet mix of ferroalloy, sodium nitrate and reducing material and using re-crystallized sodium nitrate as the sole bonding material in the dried mixture. However, the resulting addition agents were invariably characterized by severe segregation of sodium nitrate. That is, these addition agents contained numerous local excesses of sodium nitrate which, during use, caused oxidation of a relatively large amount of the ferroalloy material adjacent thereto with consequent lowering of ferroalloy recovery.

It can therefore be seen that while exothermic ferroalloy addition agents are of considerable utility in the metallurgical art, there are nevertheless significant disadvantages associated with the use of these materials which are due primarily to the bonding techniques employed in their manufacture.

It is accordingly an object of the present invention to provide an exothermic ferroalloy addition agent which is substantially free from moisture and which can be employed in metallurgical operations without excessive fuming and flaming and which provides high ferroalloy recoveries.

It is another object of the present invention to provide a process for the production of substantially moisture-free exothermic ferroalloy addition agents.

It is a further object of the present invention to provide a process for producing exothermic ferroalloy addition agents which do not cause excessive fuming or flaming when employed in open hearth steel making operations.

Figure 2:
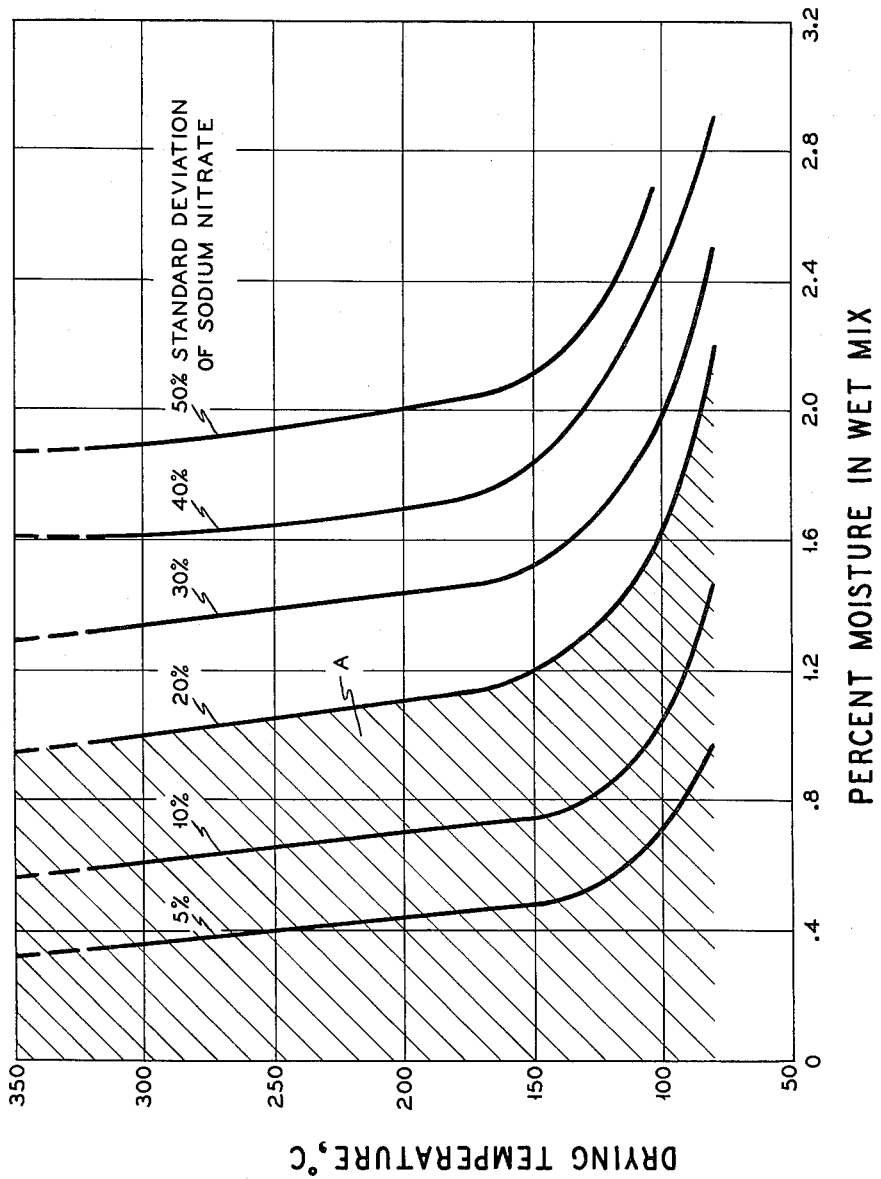

Other objects will be apparent from the follow description and claims taken in conjunction with the drawing in which FIGURE 1 is a graphical representation of process operating conditions for the production of sodium nitrate-bonded exothermic addition agents and FIGURE 2 is a rearrangement of the graphical representation of FIGURE 1 and specifically indicates the process conditions which satisfy the present invention.

A bonded exothermic ferroalloy addition agent in accordance with the present invention is an aggregate of ferroalloy, sodium nitrate and a reducing material capable of reacting exothermically with sodium nitrate. The aforesaid aggregate is characterized by having a substantially uniform distribution of sodium nitrate as the sole bonding material. By virtue of the uniformity of the sodium nitrate distribution in the addition agent subsequent oxidation of ferroalloy by sodium nitrate is substantially avoided and high ferroalloy recoveries are ensured.

The bonded exothermic ferroalloy addition agent of the present invention is produced by forming a wet mix of ferroalloy material, sodium nitrate and a material capable of reacting exothermically with sodium nitrate, the moisture content of the wet mix being between about 0.2 and about 2.2 percent; introducing the wet mix into a suitable container; and subsequently drying the wet mix at a temperature which will cause recrystallization of the sodium nitrate in a substantially uniform distribution.

It has been discovered as a part of the present invention that when using re-crystallized sodium nitrate as the bonding material in ferroalloy addition agents, a substantially uniform sodium nitrate distribution can be obtained, with consequent high ferroalloy recoveries, by controlling both the amount of moisture in the wet mix from which the addition agent is prepared and the temperature at which the wet mix is dried to produce the addition agent. This relationship between wet mix moisture content, drying temperature and resultant distribution of re-crystallized sodium nitrate is illustrated in FIGURES 1 and 2, FIGURE 2 being actually a rearrangement of FIGURE 1.

With reference to FIGURES 1 and 2, it can be seen that substantially uniform sodium nitrate distribution, i.e., a percentage standard deviation of less than about 20 is achieved in addition agents by limiting the moisture content of the wet mix to between 0.2 and 2.2 percent and drying the mix at certain elevated temperatures. For example, referring to FIGURE 1, it is seen that when the wet mix moisture content is about 2.2 percent a drying temperature of about 80° C. is required and when the wet mix moisture content is about 1 percent, drying temperatures up to about 320° C. can be used, with the lower drying temperatures providing increasing uniformity of sodium nitrate distribution. With regard to the lower drying temperatures it has been found that temperatures lower than about 80° C. are largely impractical due to the excessively long drying periods required.

It has also been found that for wet mix moisture contents less than about 0.8 percent, drying temperatures up to just below the ignition temperature of the mix can be used to provide addition agents having substantially uniform sodium nitrate distribution.

The graphical representation of FIGURE 2 show somewhat more directly the operating conditions in accordance with the present invention.

In FIGURE 2, the shaded area of the graph, which is indicated generally as A, defines the drying temperatures for corresponding wet mix moisture contents which will result in the production of sodium nitrate-bonded ferroalloy addition agents having substantially uniform sodium nitrate distribution, i.e., a percentage standard deviation of sodium nitrate of less than 20.

The expression percentage standard deviation as employed herein is defined as follows:

Percentage standard deviation =

$$\frac{\left(\sqrt{\frac{(Z_1-\overline{Z})^2+\ldots+(Z_n-\overline{Z})^2}{n-1}}\right) \times 100}{\overline{Z}}$$

where $\overline{Z}$ = the average percent concentration of sodium nitrate in the addition agent under analysis
$Z_1 \ldots Z_n$ = the percent concentration of sodium nitrate samples taken at various locations in the addition agent under analysis
$n$ = the number of samples taken $$\sqrt{\frac{(Z_1-\overline{Z})^2+\ldots+(Z_n-\overline{Z})^2}{n-1}} =$$

Standard deviation of sodium nitrate in addition agent under analysis

The various samples used in the above formula are taken at random locations throughout the addition agent in accordance with conventional analytical and statistical techniques.

The following Example I is provided to illustrate the method of calculating the percentage standard deviation of sodium nitrate in a ferroalloy addition agent.

EXAMPLE I

A bonded ferroalloy addition agent containing recrystallized sodium nitrate as the sole bonding material was prepared in a one gallon cylindrical container. The total amount of sodium nitrate in the addition agent was 12.44 percent. In this case therefore the average percent concentration of sodium nitrate in the addition agent was 12.44 = $\overline{Z}$.

Eight samples were taken and the percent concentration of sodium nitrate in the samples, was as follows:

| Percent Concentration of Sodium Nitrate in Samples | $\overline{Z}_1$ through $\overline{Z}_8$ | |
|---|---|---|
| | $Z(1\ldots)-\overline{Z}$ | $(Z(1\ldots)-\overline{Z})^2$ |
| $Z_1$=12.53 | 0.09 | 0.0081 |
| $Z_2$=12.54 | 0.10 | 0.010 |
| $Z_3$=11.77 | 0.67 | 0.4489 |
| $Z_4$=13.01 | 0.57 | 0.3249 |
| $Z_5$=11.92 | 0.52 | 0.2704 |
| $Z_6$=12.69 | 0.25 | 0.0625 |
| $Z_7$=12.13 | 0.31 | 0.0961 |
| $Z_8$=12.94 | 0.50 | 0.2500 |
| | | Σ1.4709 |

Standard deviation = $\sqrt{\frac{1.4709}{8-1}} = 0.46$

Percentage standard deviation = $\frac{0.46}{12.44} \times 100 = 3.7$

The above value of percentage standard deviation indicates statistically that 68 percent of the addition agent under analysis has a sodium nitrate concentration within ±3.7 percent of the average value of sodium nitrate concentration in the addition agent. That is, 68 percent of the addition agent has a percent sodium nitrate concentration in the range of 12.44±0.46.

A more specific description of the manner in which the present invention is practiced is as follows:

Ground ferroalloy material such as ferrochrome or ferromanganese, sodium nitrate, and finely ground reducing material exothermically reactive with sodium nitrate, e.g., silicon or aluminum, are blended in the dry state. For purposes of convenience and economy, the reducing material used in the mixture is most often in the form of an alloy, such as ferrosilicon. With regard to the sizing of the dry materials, particles from about one inch down to very fine sizes, e.g., 40 mesh by down, can be satisfactorily employed.

After the dry mixing, water is added in an amount to provide a wet mix containing between 0.2 and 2.2 percent moisture. The resultant wet mix is then introduced into suitable containers such as one or two gallon cans of the type generally employed in the manufacture of exothermic additions.

A description of two such containers is as follows:

| | One gallon container | Two gallon container |
|---|---|---|
| Dimensions | 7 1/16 inches diameter, 8 1/8 inches in height; round open top; side seam not soldered. | 10 3/16 inches diameter, 7 5/16 inches in height, 5 1/2 inch diameter screw neck; side seam not soldered. |
| Material | Black plate, enamelled inside and out. | Black plate. |

After filling with wet mix, the open containers are dried at temperatures which correspond to a moisture content within the shaded area of FIGURE 2. For example, for a wet mix moisture content of about 1.2 percent, drying temperatures up to about 150° C. can be employed. As a result of drying, substantially all the moisture is removed from the mix and the sodium nitrate is re-crystallized with consequent bonding of the mixture.

As to the upper and lower limits of moisture content in the wet mix, it has been found that at moisture contents above about 2.2 percent excessively long drying periods are required. On the other hand, when starting with moisture contents of less than about 0.2 percent, satisfactory bonding is not regularly obtained and a considerable amount of fines is generally produced.

In the practice of the present invention, the proportion of sodium nitrate in the mix can vary from about 3 percent up to about 25 percent. Usually, however, exothermic ferromanganese additions contain from about 7 to 9 percent sodium nitrate, while exothermic ferrochromium additions contain from about 8 to 15 percent.

An example of a typical mixture order for a ferrochrome exothermic addition agent is set forth in Table I:

*Table I*

MIXTURE ORDER—TWO GALLON CONTAINER

|  | Percent | Pounds |
|---|---|---|
| Charge chrome (8 MXD) | 86.163 | 47.943 |
| Ferrosilicon (20 MXD) | 1.840 | 1.024 |
| Sodium nitrate | 11.997 | 6.675 |
| Total | 100.000 | 55.642 |
| Water added | 0.80 | 0.445 |

Charge chrome—52.16 percent Cr, 4.78 percent Si, 6.5 percent C.
Ferrosilicon—47.90 percent Si.
Chromium in dry mix—44.930 percent (25.000 lbs.).
Silicon in dry mix—5.000 percent (2.782 lbs.).
Carbon in dry mix—5.600 percent (3.116 lbs.).

The aforedescribed mixture order was dried at about 105° C. for about 16 hours. The resulting sodium nitrate bonded addition agent was substantially free of water and the percentage standard deviation of sodium nitrate was about 7 percent.

In a preferred embodiment of the process of the present invention, the moisture content of the wet mix is limited to between 0.2 percent and about 0.8 percent and the drying of the wet mix is conducted at between 80° C. and 150° C. In this embodiment of the invention, convenient temperatures can be used for relatively short periods of time, i.e., usually less than about 24 hours, and the percentage standard deviation of sodium nitrate in the resulting exothermic addition agent will be less than 20 percent.

Experimental data derived in the practice of the present invention is set forth in the following Table II:

In the practice of the present invention, although it may at times be more practical to do so, a constant drying temperature need not be employed. That is to say, in producing an addition agent having a substantially uniform sodium nitrate distribution, the drying temperature may be varied so long as the temperatures employed fall substantially within the shaded area of the graph of FIGURE 2. Thus, as drying proceeds, and the moisture content of the wet mix decreases, higher drying temperatures can be used if desired. By this technique the time required for the drying operation can be substantially reduced.

From the foregoing description it can be seen that the present invention constitutes a substantial benefit to the art by providing a bonded ferroalloy addition agent which is free from water and other materials which interfere with metallurgical operations and which is characterized by providing high recoveries of ferroalloy due to substantially uniform distribution of sodium nitrate in the addition agent.

What is claimed is:

1. A process for producing a bonded exothermic ferroalloy addition agent which comprises preparing a wet mix of ferroalloy material, sodium nitrate and a reducing metal, said ferroalloy material being selected from the group consisting of ferrochromium and ferromanganese, said reducing metal being selected from the group consisting of aluminum and silicon, and the initial moisture content of the wet mix being between about 0.2 percent and 0.8 percent; introducing the wet mix into suitable containers; and drying the contained wet mix in the range of 80° C and 150° C.

2. An addition agent made in accordance with claim 1.

*Table II*

| Drying temp. (° C.) | Percent moisture in wet mix | Type container | Drying period (hrs.) | Moisture content after drying period | Average concentration of sodium nitrate (percent) | Percentage standard deviation |
|---|---|---|---|---|---|---|
| 110 | 0.81 | 1 gal | 16 | Nil | 12.20 | Less than 20%. |
| 110 | 1.03 | do | 16 | do | 12.74 | Do. |
| 110 | 1.06 | do | 16 | do | 12.87 | Do. |
| 100 | 0.81 | do | 16 | do | 12.63 | Do. |
| 75 | 0.80 | do | 32 | do | 12.44 | Do. |
| 65 | 0.80 | do | 48 | do | 12.03 | Do. |
| 90 | 0.80 | do | 38 | do | 12.18 | Do. |
| 150 | 0.81 | do | 15 | do | 12.58 | Do. |
| 110 | 1.22 | do | 26 | do | 13.33 | Do. |
| 110 | 1.63 | do | 26 | do | 14.04 | Do. |
| 80 | 1.62 | do | 108 | do | 13.55 | Do. |
| 80 | 0.81 | do | 60 | do | 12.99 | Do. |
| 80 | 1.22 | do | 75 | do | 12.63 | Do. |
| 150 | 0.41 | do | 20 | do | 12.44 | Do. |
| 150 | 1.22 | do | 20 | do | 12.93 | Do. |
| 105 | 0.80 | 2 gal | 16 | do | 12.40 | Do. |
| 150 | 0.40 | 1 gal | 18 | do | 12.21 | Do. |
| 150 | 1.20 | do | 18 | do | 13.76 | Do. |
| 150 | 0.80 | do | 18 | do | 12.31 | Do. |
| 150 | 0.80 | 2 gal | 18 | do | 12.36 | Do. |
| 80 | 1.20 | 1 gal | 57 | do | 12.86 | Do. |
| 80 | 0.40 | do | 40 | do | 12.16 | Do. |
| 80 | 1.60 | do | 81 | do | 12.57 | Do. |
| 80 | 1.60 | 2 gal | 90 | do | 12.78 | Do. |
| 150 | 0.80 | 1 gal | 18 | do | 11.94 | Do. |
| 320 | 0.80 | do | 5 | do | 11.40 | Do. |
| 180 | 1.70 | do | 4 | do | 13.39 | Do. |
| 150 | 1.62 | do | 15 | do | 15.55 | Do. |
| 80 | 2.85 | do | 72 | Still wet | 16.40 | Do. |
| 150 | 1.60 | do | 18 | do | 13.82 | Do. |
| 150 | 1.60 | do | 14 | do | 13.37 | Do. |
| 80 | 2.60 | do | 165 | do | 13.15 | Do. |
| 320 | 1.60 | do | 5 | do | 12.04 | Do. |
| 320 | 2.00 | do | 5 | do | 13.84 | Do. |

References Cited by the Examiner

UNITED STATES PATENTS

| 1,942,173 | 1/1934 | Justheim | 75—57 |
| 2,446,759 | 8/1948 | Griffiths | 75—57 |
| 2,527,186 | 10/1950 | Griffiths | 75—57 |
| 2,850,373 | 9/1958 | Boucek | 75—53 |

ALEXANDER H. BRODMERKEL, *Primary Examiner.*

MORRIS LIEBMAN, *Examiner.*

A. LIEBERMAN, J. B. EVANS, *Assistant Examiners.*